US009148249B2

(12) United States Patent
Aizawa (10) Patent No.: US 9,148,249 B2
(45) Date of Patent: Sep. 29, 2015

(54) DIGITAL BROADCASTING RECEIVER (71) Applicant: Kabushiki Kaisha Toshiba, Tokyo (JP)

(72) Inventor: Masami Aizawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 72 days.

(21) Appl. No.: 13/783,036

(22) Filed: Mar. 1, 2013

(65) Prior Publication Data

US 2013/0301632 A1 Nov. 14, 2013

(30) Foreign Application Priority Data

May 14, 2012 (JP) ................. 2012-110794

(51) Int. Cl.
H04J 3/16 (2006.01)
H04L 1/00 (2006.01)
H04L 27/26 (2006.01)
(52) U.S. Cl.
CPC .......... *H04L 1/0036* (2013.01); *H04L 27/2647* (2013.01)
(58) Field of Classification Search
None
See application file for complete search history.

(56) References Cited

U.S. PATENT DOCUMENTS

| 5,867,539 | A | 2/1999 | Koslov |
| 7,043,680 | B2 * | 5/2006 | Aizawa .................. 714/776 |
| 2008/0304587 | A1 | 12/2008 | Setoh et al. |

FOREIGN PATENT DOCUMENTS

| JP | H11-346205 A | 12/1999 |
| JP | 2000-306459 | 11/2000 |
| JP | 2001-044965 A | 2/2001 |
| JP | 2006-186421 A | 7/2006 |
| JP | 3872950 | 1/2007 |
| JP | 2010-041627 | 2/2010 |
| JP | 2010-154417 | 7/2010 |
| JP | 2013-535883 A | 9/2013 |

OTHER PUBLICATIONS

Japanese Office Action dated Mar. 24, 2015 in counterpart Japanese Patent Application.

* cited by examiner

*Primary Examiner* — Afshawn Towfighi
(74) *Attorney, Agent, or Firm* — Patterson & Sheridan, LLP (57) ABSTRACT

A receiver receives frequency division multiplexing transmission signals of multiple carriers, and includes a difference detection unit, an integration unit, a noise detection unit, a selection unit, and a correction unit. The difference detection unit calculates a difference that is representative of the amount of noise in the frequency division multiplexing transmission signals. The integration unit integrates for each frequency of the multiple carriers the difference output of the difference detection unit. The noise detection unit determines whether or not impulse noise is present in the input signal. When impulse noise is present, the selection unit supplies the integrator output to the correction unit. When impulse noise is not present, the selection unit supplies the calculated difference output to the correction unit.

17 Claims, 5 Drawing Sheets

DIGITAL BROADCASTING RECEIVER

CROSS-REFERENCE TO RELATED APPLICATION

This application is based upon and claims the benefit of priority from Japanese Patent Application No. 2012-110794, filed May 14, 2012; the entire contents of which are incorporated herein by reference.

FIELD

Embodiments described herein relate to a digital broadcasting receiver that adaptively determines and removes normal noise that is constant in nature and impulse noise that occurs spontaneously.

BACKGROUND

In digital transmission systems, error correction plays an important role as a countermeasure for variations in time, frequency, and deterioration of the reception environment. Furthermore, error corrections are applied as countermeasures for multipath interference, interference waves, etc.

In multi-carrier transmissions, such as orthogonal frequency division multiplexing (OFDM), time/frequency transforms of fast Fourier transforms (FFTs) are carried out on a series of data to provide a guard interval, and then transmission is carried out. The series of data that includes the guard interval and the data portion is referred to herein as a frame.

Incidentally, when interference with a high dependency on frequency is present, such as interference for digital television broadcasting signals, e.g., analog television broadcasting signals, it has been found that it is effective to correct it by detecting the frequency carriers of the interference in the frequency domain, and removing the detected interference frequency carriers (this is known as erasure correction).

For example, in order to increase the reliability of the detection methods of interference, detection of the frequency carriers of the interference is performed, by carrying out an integration process or the like, and accumulating the interference components across several frames, and determining whether the interference has exceeded a preset level.

Unfortunately, in situations where the reception state fluctuates by large amounts in time as a result of impulse noise, for example, in the above mentioned integration process, it is difficult to adapt to the large instantaneous changes in the reception level (e.g., to detect the change and to implement proper corrections).

DETAILED DESCRIPTION

A digital broadcasting receiver is provided that can instantly adapt to situations where the receiver's state of reception fluctuates by large amounts in time (e.g., state of reception that includes impulse noise) and can detect and remove the impulse noise, in addition to being able to detect and remove normal noise that is associated with frequency variations that occur constantly.

Embodiments are described below with reference to the drawings.

First Embodiment

Figure 1:
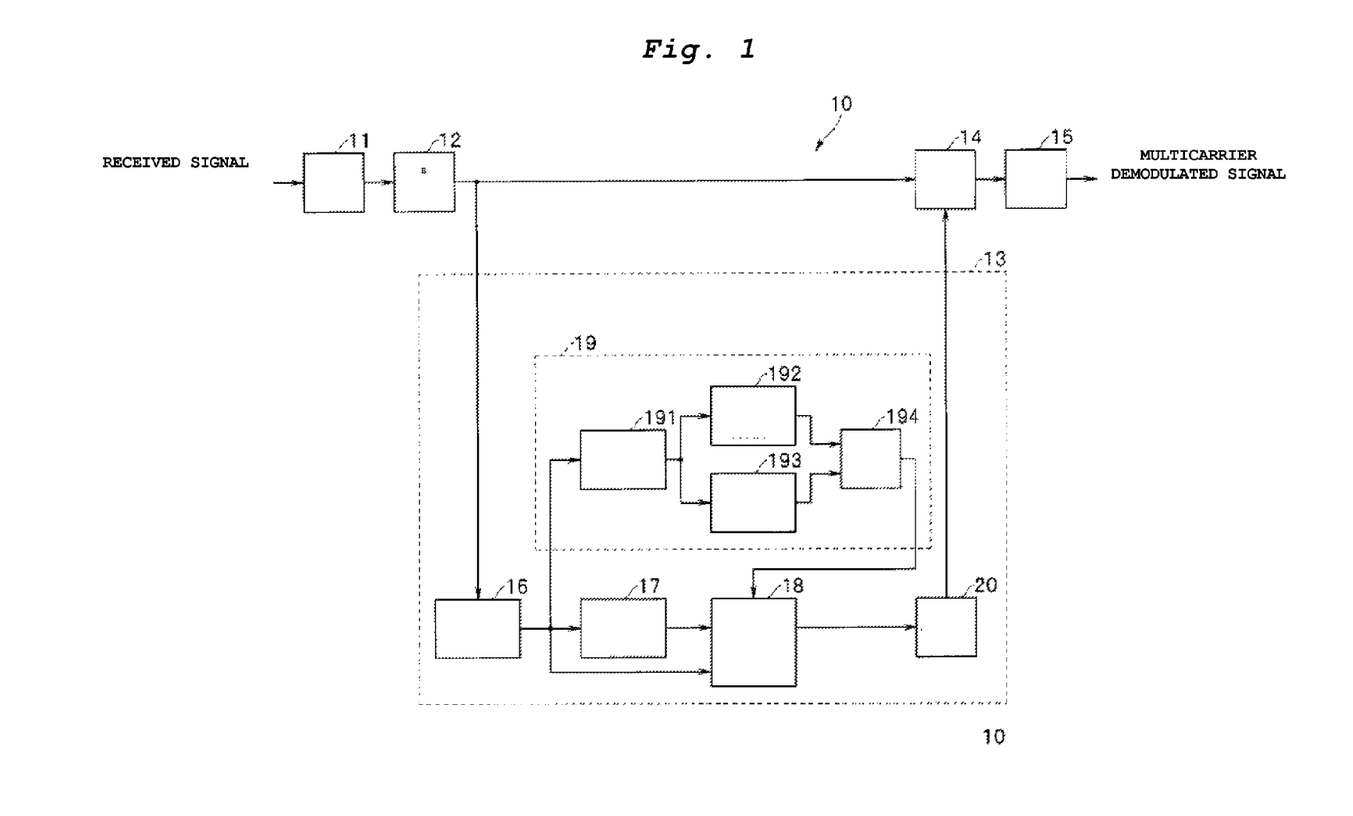
FIG. 1 is a block diagram of a digital broadcasting receiver according to a first embodiment.

FIG. 1 is a block diagram of a digital broadcasting receiver of a first embodiment. The digital broadcasting receiver 10 of the first embodiment is a digital broadcasting receiver that receives frequency division multiplexing transmission signals of multiple carriers (e.g., orthogonal frequency division multiplexing transmission signals), and has a functionality that detects and compensates interference signals that are impulse-like (e.g., impulse noise). Also, the digital broadcasting receiver 10 has a functionality that detects and compensates interference signals (e.g., normal noise) associated with the frequency variations that occur constantly. Here, compensation means the reduction, or removal (e.g., erasure) of the power level of the data portion that has been determined as interference.

The digital broadcasting receiver of the embodiments is a digital broadcasting receiver that receives frequency division multiplexing transmission signals of multiple carriers, and is includes the following: a frequency domain transformer unit that transforms a received time domain signal to a frequency domain signal; a demodulation unit that performs demodulation by carrying out equalization of the frequency domain signal; a difference detection unit that receives the demodulated output of the demodulation unit and calculates the difference between representative symbols (each corresponding to the nearest symbol on the ODFM constellation) and received symbols; an integrator unit that integrates for each frequency the difference output of the difference detection unit; a noise detection unit that detect a noise level by calculating an average within a frame of the difference output of the difference detection unit; a first quality determination unit that detects whether the output of the noise detection unit exceeds a first threshold value; a second quality determination unit that detects whether the output of the noise detection unit falls below the second threshold value; a detection unit that detects the impulse noise based on the quality determination results of the first and second quality determination units; a selection unit that switches between the difference output of the difference detection unit and the integration output of the integrator unit and outputs them depending on the impulse noise detected in the detection unit; a determination unit that determines whether the size of the output selected at the selection unit has exceeded the threshold value; and a correction unit that compensates the output of the demodulation unit on the basis of the determination result of the determination unit.

The digital broadcasting receiver 10 includes an FFT unit which is a frequency domain transformer unit, an equalization unit 12 which is a demodulation unit, an interference determination unit 13, a correction unit 14, and an error correction unit 15. The interference determination unit 13 includes a hard decision unit 16 which is a difference detection unit, an integrator unit 17, a selection unit 18, an impulse detection circuit 19, and a determination unit 20. Impulse detection circuit 19 includes an averaging unit 191, a first quality determination unit 192, a second quality determination unit 193, and a detection unit 194.

The FFT unit 11 converts a received time domain signal into a frequency domain signal. The FFT unit 11 outputs the frequency domain signal (R(k), where k=1, 2, 3, ..., n) to the equalization unit 12. The equalization unit 12 calculates the transmission line response estimate of the frequency domain and then carries out equalization for the frequency domain signal using that transmission line response estimate. The frequency domain signal is output to the correction unit 14.

The hard decision unit 16, in which a hard determination of the equalization output of the equalization unit 12 is carried out, calculates the difference between the representative symbol and received symbol in two levels. The calculated difference signal is one that represents the noise components, for example, interference components. Instead of the hard decision unit 16, a configuration that uses a soft determination unit that calculates the difference between the representative symbol and the received symbol in multiple levels may also be used.

The integrator unit 17 reads the data per frequency carrier from the memory (not shown in the drawing), and stores the data in the memory after integration. The integrator unit 17 uses the data between frames and may be an IIR (infinite impulse response) filter, an FIR (finite impulse response) filter, a section integral filter, etc. In the first embodiment, there is no limit to what device can be used as the integrator unit 17.

In the impulse detection circuit 19, the averaging unit 191, which is the noise detection unit, is implemented as a frequency domain averaging unit that takes the average on the frequency domain, and calculates the average value inside the frame of the difference output of the hard decision unit 16, for example, the received noise level. Then, the first quality determination unit 192 compares the received noise level with the first threshold value (e.g., the upper limit) and checks whether or not the noise level has exceeded the first threshold value. The second quality determination unit 193 compares the received noise level with the second threshold value (e.g., the lower limit) and checks whether or not the noise level falls below the second threshold value. The detection unit 194 checks whether or not the two quality determination conditions described above are being satisfied within a certain fixed period of time, and detects the impulse noise.

Here, the two quality determination conditions are, for example, within a fixed period of time, (1) exceeding the first threshold value and (2) falling below the second threshold value. If both of the quality determination conditions described above are satisfied, the detection unit 194 decides that the impulse noise is present, and if both of the quality determination conditions described above are not satisfied, then the detection unit 194 decides that the impulse nose is absent.

Depending on the detection results of the impulse noise of the impulse detection circuit 19, the selection unit 18 selects and outputs the difference output of the hard decision unit 16 or the integration output of the integrator unit 17. The selection unit 18 selects the difference output of the hard decision unit 16 if the impulse noise is detected by the impulse detection circuit 19, selects the integration output of the integrator unit 17 if the impulse noise is not detected, and then outputs the selection (e.g., either the difference output of the hard decision unit or the integration output of the integrator unit) to the determination unit 20.

In the determination unit 20, determination of interference is carried out for the output of the selection unit 18. The determination unit 20 determines whether or not the size of the output selected in the selection unit 18 has exceeded a predetermined threshold value. For example, the determination unit 20 compares the output from the selection unit 18 with a given threshold value, and when the output is larger than the threshold value, regards the output as interference, and then outputs that interference determination result to the correction unit 14.

The correction unit 14 receives the determination result from the determination unit 20, and carries out a compensation process (e.g., erasure process) for the equalization output from the equalization unit 12, and outputs to the subsequent error correction unit 15.

As the methods of compensation, there exist a method in which a constant lower than 1.0 is multiplied with the data corresponding to the compensation process, a method in which the data corresponding to the compensation process is limited to being below a certain value, a method in which the data corresponding to the compensation process is masked or eliminated. In actuality, the portions regarded as interference are often masked or eliminated. It is believed that even other compensation methods exist, and in the present embodiment, there is no dependence on the method of compensation.

Figure 2:
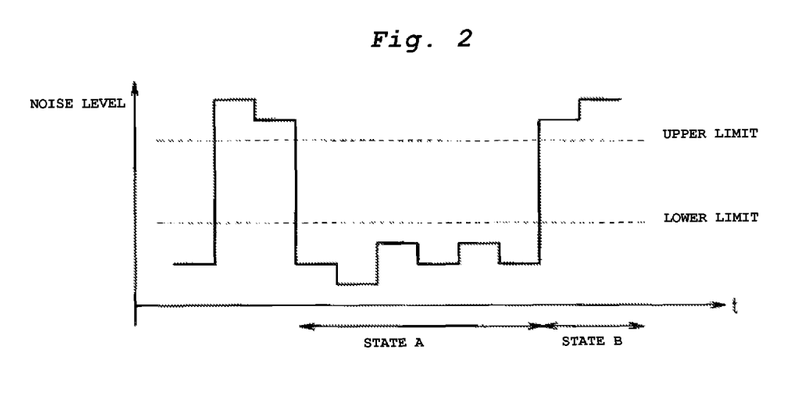
FIG. 2 is a state diagram showing fluctuating levels of impulse noise.

Next, the impulse noise is described. FIG. 2 shows a state in which impulse noise exists in the received signal. The horizontal axis is time t, and the vertical axis is the noise level.

In the good state A where the normal noise level is small, the reception conditions are good, whereas in the interval of state B, the reception conditions deteriorate very severely. In the impulse detection circuit 19, the impulse noise is detected by ascertaining (e.g., calculating) the status of this type of noise level per frame in the averaging unit 191, and using both the first and second threshold values (e.g., upper limit value and lower limit value) as shown in FIG. 2 in the first and second quality determination units 192 and 193, to determine by the detection unit 194 the conditions in which the inferior portion B (e.g., portion in which the noise level instantaneously changes greatly) and the portion A in which the reception conditions are good (e.g., portion in which the noise level is low and flat) occur within a fixed time. When the impulse noise is detected in this manner, the selection unit 18 is switched on the basis of this detected signal, the difference output from the hard decision unit 16 is selected and then is outputted to the determination unit 20. In conditions in which the impulse noise is not detected, the selection unit 18 selects the integration output from the integrator unit 17, and then outputs the integration output to the determination unit 20. In this manner, by adaptively switching between the difference output at the time impulse noise is present and the integration output at the time impulse noise is not present (e.g., at the time of normal noise), it is possible to determine any kind of interference and remove the interference.

Due to the fact that impulse-like noise that gets mixed in at the transmission process by time or frequency interleaving (e.g., transmission side), which is a technique related to error correction, is subdivided and scattered in the data by de-interleaving at the receiving side, the interference data undergoes a correction process by the neighboring signals. In addition, in the error correction of the error correction unit 15, by carrying out the correction process using the reliability information of the received signal (e.g., the information about presence/absence of erasure in the output of the correction unit 14), it is possible to improve performance, and erasure corrections, etc., can be used in general.

As described above, the reason for the necessity of switching between the output of the hard decision unit 16 and the output of the integrator unit 17 depending on the impulse detection, and then outputting to the determination unit 20, is described below with reference to FIG. 3.

Figure 3:
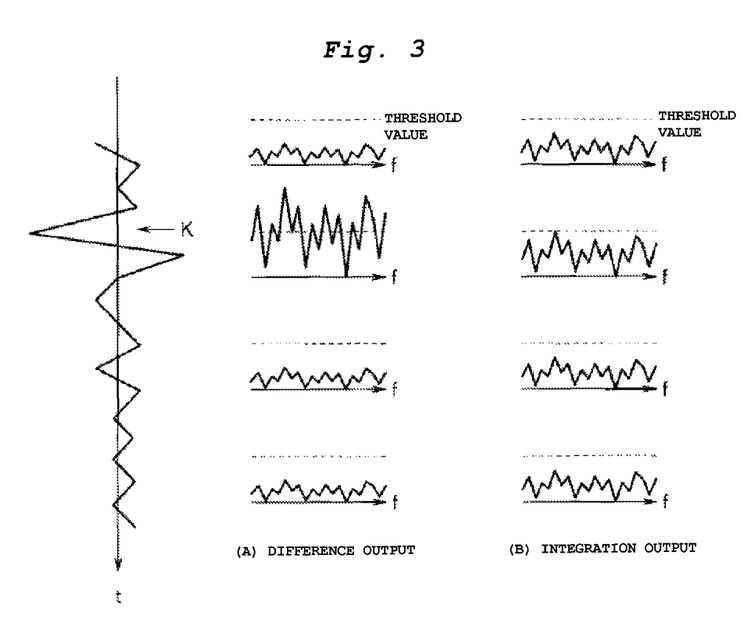
FIG. 3 is a state diagram showing differences in output of a hard decision unit and an integrator unit.

FIG. 3 is a state diagram that compares a difference output of the hard decision unit 16 with an integration output of the integrator unit 17. A time axis t representing elapse of time is illustrated in the vertical direction of the diagram from the top to the bottom of FIG. 3, and the waveforms of the difference output (e.g., noise components) after hard determination are shown along the time axis t. The frequency component waveforms (e.g., spectrum) corresponding to each of the four points in time of these difference output waveforms are being shown for (a) difference output and (b) integrator output (described in frequency domain f). Between the difference output and integrator output, the portion of each of the frequency component waveforms (e.g., spectrum) that differs greatly from the other is the frequency component waveform, which is the second one from the top, and corresponds to the time position (indicated by the symbol K) of a large amplitude fluctuation waveform of the difference output on the time axis t. For the large amplitude fluctuations at K on the time axis t, even the frequency component waveforms for the (a) difference output cause large amplitude variations on the frequency domain f, and fluctuate with a size that crosses a certain threshold value, and are in a state so as to be determined as interference. On the other hand, for the (b) integrator output at substantially the same time location K, due to those frequency component waveforms being originated by the integration process, the amplitude variations do not reach a level that crosses a certain threshold value, and as a result maintain a state in which the amplitude variations are not determined as interference.

In this manner, although for the (b) integration output of the integrator unit 17, since the integration output is a smoothed output, instantaneous large variations are not observed on the frequency domain, and interfering waves (e.g., impulse noise) with instantaneous large variations are not detected using a fixed threshold value. On the other hand, for the (a) difference output of the hard decision unit 16, since integration is not being done, the influence of interfering waves (e.g., impulse noise) with instantaneous large variations appear immediately on the frequency domain, and it is possible to detect the impulse-like interfering waves even with the above mentioned fixed threshold value.

That is, after the detection of impulse noise, by outputting the difference output of the hard decision unit 16 to the determination unit 20, even in the conditions where the reception state fluctuates intensely in time such as impulse noise, it is possible to take immediate action and remove the noise.

According to the digital broadcasting receivers of the first embodiment, it is possible to instantly take action in the conditions where the reception state fluctuates by large amounts in time as a result of, for example, impulse noise, determine this fluctuation, and perform erasure corrections, etc.

Second Embodiment

Figure 4:
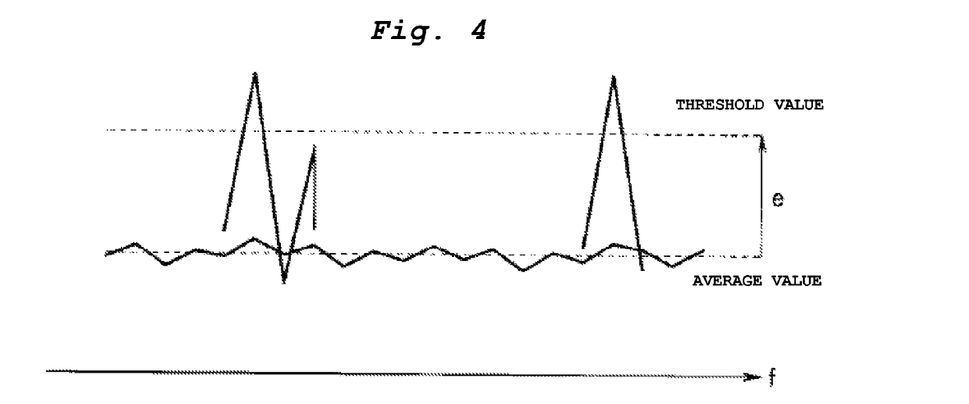
FIG. 4 is a diagram that shows an example of an interference detection operation.
Figure 5:
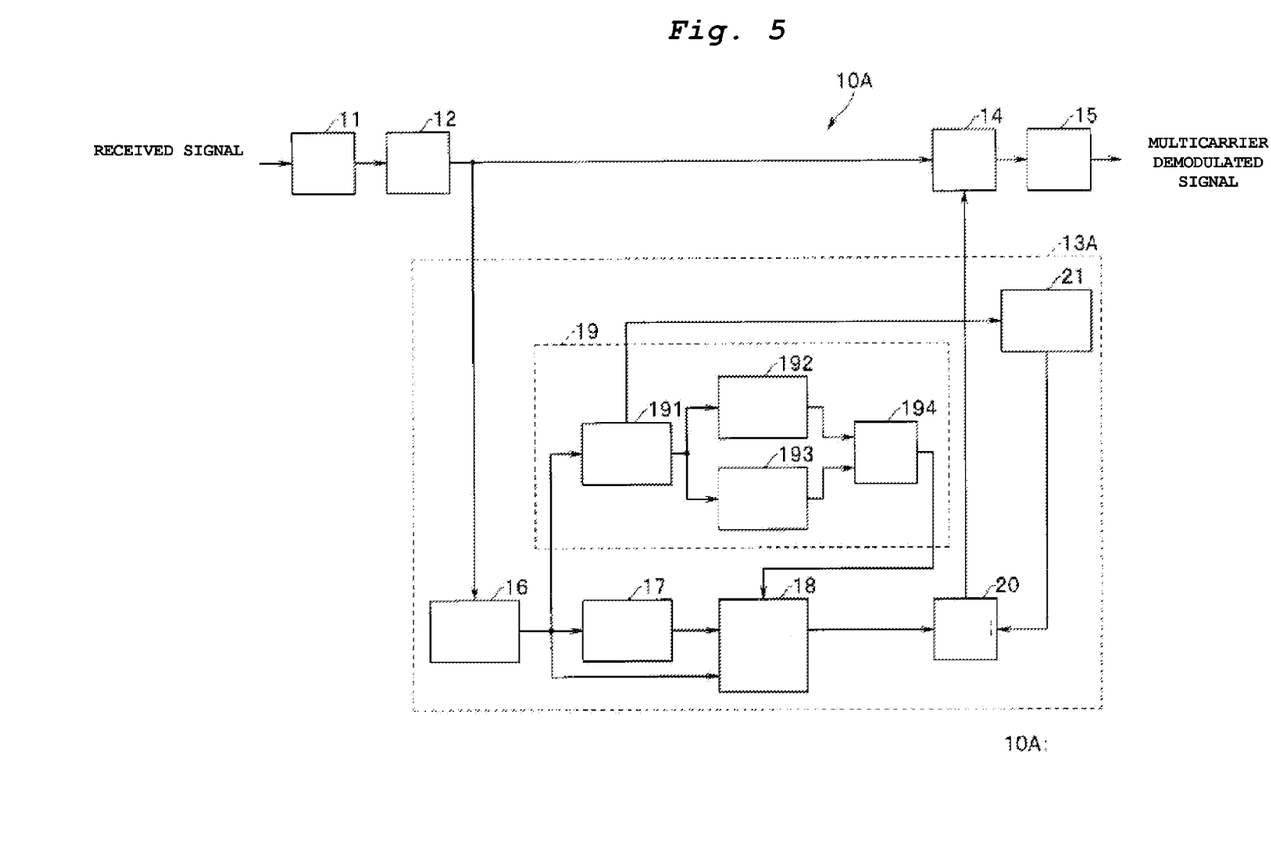
FIG. 5 is a block diagram of a digital broadcasting receiver according to a second embodiment.
Figure 6:
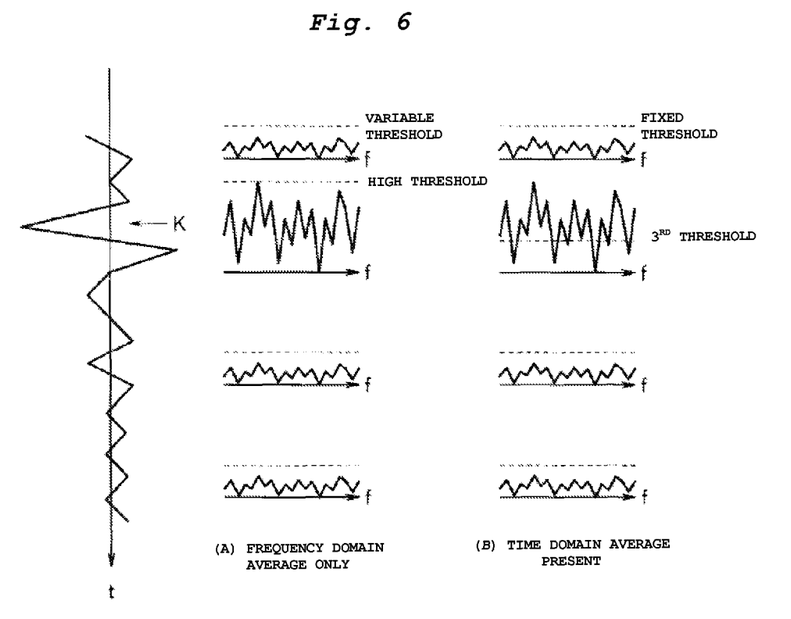
FIG. 6 is a state diagram that compares the interference detection operation of FIG. 4 and the interference detection operation using the digital broadcasting receiver of FIG. 5.

FIG. 4 is a diagram that describes an example of an interference detection operation. FIG. 5 is a block diagram of a digital broadcasting receiver according to a second embodiment. FIG. 6 is a state diagram that compares the interference detection operation of FIG. 4 and the interference detection operation using the digital broadcasting receiver of FIG. 5.

While considering transmission conditions such as modulation methods and coded rate, a method is provided in which the threshold value of interference determination is not constant but is calculated from the entire reception level.

Since the interference level is estimated after viewing the interference level in the frequency domain and comparing the interference level with other frequency carriers, it is possible to determine the interference level as shown in FIG. 4.

For example, by calculating the average value of the signal power within one frame and setting the threshold value at an upper level with just the predetermined value e from that average value, in the case when the level of at least one complete frame fluctuates, it is possible to detect only the singular point (e.g., the impulse noise) projected on the frequency domain f.

However, in the averaging unit 191, which is a noise detection unit that averages the difference output of the hard decision unit 16 as in FIG. 1, if the average value (which is the average value on the frequency domain) of the signal power within one frame is calculated, and if the first and second threshold values are calculated and set in the first and second quality determination units 192 and 193, when the impulse noise is at least longer than one frame, by averaging only in the frequency domain of (a) as shown in FIG. 6, when the amplitude instantaneously changes greatly at the time position K, for the case of averaging of only the frequency domain of (a), the threshold value of that upper limit side is calculated and set as a higher value. This upper limit is a situation where the peak of interference is exceeded, and the problem of not being able to detect interference may occur. FIG. 5 provides a configuration that solves this problem.

FIG. 5 is a block diagram of a digital broadcasting receiver according to a second embodiment. For the portions that are substantially the same as that in FIG. 1, the portions are given corresponding symbols.

The digital broadcasting receiver 10A of the embodiment of FIG. 5 includes the FFT unit 11, the equalization unit 12, an interference determination unit 13A, the correction unit 14, and the error correction unit 15.

The interference determination unit 13A includes the hard decision unit 16, the integrator unit 17, the selection unit 18, the impulse detection circuit 19, the determination unit 20, and a time domain averaging unit 21, which is a threshold value calculation unit.

As described above, the impulse detection circuit 19 includes the averaging unit 191, which is a frequency domain averaging unit and differs from the time domain averaging unit 21 that takes an average in the time domain. The second embodiment differs from the first embodiment in that a time domain averaging unit 21 is newly provided as a threshold value generation unit. The time domain averaging unit 21 receives the average value output in the frequency domain from the averaging unit 191, calculates the average value in the time domain between frames, and generates the third threshold value on the basis of that average value. The third threshold value will be used as the threshold value by the determination unit 20.

In the averaging unit 191 that averages the difference output of the hard decision unit 16, the average value of the signal power within 1 frame, for example, the received noise level, is calculated. By additionally taking the time average of that in the time domain averaging unit 21, the third threshold value can be generated at a higher level from that average value and the third threshold value can be output and set in the determination unit 20 (refer to FIG. 6(b)). As a result, even in the case when the entire level fluctuates, it is possible to detect only the singular point.

According to the second embodiment, by additionally time averaging the results of averaging in a frame of the frequency direction of noise, it is possible to detect the abnormalities when viewed not just in frequency but also in time domain, and it is also possible to detect the impulse noise across multiple frames.

Even in the digital broadcasting receivers of the second embodiment, it is possible to take action instantly in the situations where the reception state fluctuates by large amounts in time such as impulse noise, to determine this reception state, and to do erasure corrections, etc.

Third Embodiment

Figure 7:
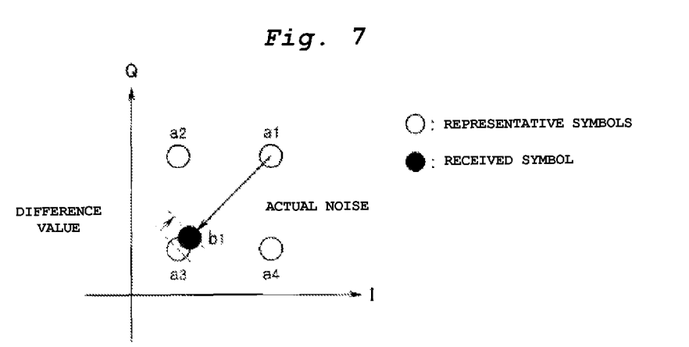
FIG. 7 is a state diagram showing difference detection in the hard decision unit when there is a large interference.

A digital broadcasting receiver according to a third embodiment will be described now. Referring to FIG. 7, a preferred erasure correction process, which is necessary when implementing the detection and elimination of impulse noise, will be described.

FIG. 7 is a state diagram of showing difference detection in the hard decision unit when there is a large interference. Representative symbols a1-a4 (white circles) are ideal signal points in the IQ plane. A received symbol b1 (a black circle) is the actually received signal point. Although the received symbol b1 corresponds to the representative symbol a1, the position of the received symbol b1 has deviated significantly from the representative symbol a1, and the received symbol b1 is located in the vicinity of another representative symbol a3. In such a situation, at the receiving end, even though the difference between the representative symbol a1 and received symbol b1 is the actual noise (shown by a long arrow), an error occurs wherein the difference value (shown by a short arrow) between the received symbol b1 and the representative symbol a3 (the symbol closest to the received symbol b1) gets calculated.

Actually, the noise level which is the difference between the representative symbol and received symbol is random in time and frequency, and when a large interference enters, as shown in FIG. 7, the received symbol b1 goes well beyond the representative symbol a1, and moves closer to another representative symbol (for example, a3), and may be a small value when calculating the difference. In these cases, omissions occur only for a single carrier. For example, it is difficult to determine correctly the interference with only an instantaneous value. Then, if the omissions increase, the performance against interference degrades. Therefore, in normal interference determination, integration processing over at least one frame to prevent omissions is carried out. Specifically, when impulse noise is detected, and the selection unit 18 is switched from the integration output to the real time difference output that has not been integrated, the omissions (erroneous difference calculations) as in FIG. 7 are likely to occur. In the conditions in which omissions occur easily, since the amount of losses also increases, it is preferable to eliminate the entire corresponding frame.

Consequently, from the perspective of the whole carrier when the amount of losses are extremely large, the noise is significant and the whole carrier is in a state known as full of noise. Specifically when detection of impulse noise is being carried out and then there is a lot of noise, there is a possibility that the circumstances such as in FIG. 7 occur, and at that time the corresponding frame that has significant noise must be eliminated entirely.

Therefore, when the number of carriers that have been detected as interference are greater than a predetermined detection amount, by eliminating the entire corresponding frame, it is possible to avoid missing the interference that must be eliminated. For example, when the compensation by the correction unit 14 is implemented during the erasure process, at the time the amount of loss is greater than a fixed amount, the configuration should be one in which another correction unit (not shown in the drawing) that eliminates the whole of the corresponding frame is provided in the subsequent stage of the correction unit 14 (e.g., between the correction unit 14 and the error correction unit 15).

In the digital broadcasting receivers of the third embodiment, it is possible to take action instantly in the conditions where the reception state fluctuates intensely in time such as impulse noise, to determine this fluctuation, and to do erasure corrections, etc.

According to the digital broadcasting receivers of the embodiments mentioned above, even if there is a noise with impulse characteristics, it is possible to carry out interference determination and to eliminate the interference.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A noise compensation method for frequency division multiplexing signals of multiple carriers, comprising:
   determining whether or not an impulse noise is present in a time domain signal corresponding to the frequency division multiplexing signals of multiple carriers;
   calculating a difference between a signal based on the time domain signal and a reference signal that does not have any noise components, the calculated difference being representative of an amount of noise in the time domain signal; and
   selecting one of first and second outputs each generated from the calculated difference based on whether or not the impulse noise is determined to be present and supplying the selected output to an interference determining unit, wherein
   the first output is supplied if the impulse noise is determined to be present, and
   the second output is supplied if the impulse noise is determined not to be present, the second output being generated by integrating the calculated difference over multiple predetermined time intervals.

2. The method of claim 1, wherein the first output is generated by calculating a frequency domain average of the calculated difference over a predetermined time interval.

3. The method of claim 1, wherein the difference is calculated by:
   converting the time domain signal into a frequency domain signal;
   demodulating the frequency domain signal; and
   comparing the demodulated signal with a reference signal that does not have any noise components.

4. A noise compensation method for frequency division multiplexing signals of multiple carriers, comprising:
   converting a time domain signal of multiple carriers into a frequency domain signal;
   performing demodulation of the frequency domain signal to generate a measured output;
   calculating a difference between the measured output and a representative output to generate a difference output;
   integrating for each of frequencies of the multiple carriers the difference output to generate an integration output;

determining whether or not impulse noise is present in the time domain signal based on the difference output;

selecting the difference output if the impulse noise is determined to be present and the integration output if the impulse noise is determined to be not present; and supplying the selected one of the difference output and the integration output to an interference determining unit.

5. The method of claim 4, wherein said determining includes:

detecting noise levels by calculating a frequency domain average of the difference output calculated over a predetermined time interval; and comparing the frequency domain average with first and second threshold values, wherein the impulse noise is determined to be present if the frequency domain average exceeds the first threshold value and falls below the second threshold value.

6. The method of claim 5, further comprising:

determining whether the size of the output supplied to the interference determining unit exceeds a third threshold value; and performing error correction on the frequency division multiplexing signals with an error correction unit if the size exceeds the third threshold value.

7. The method of claim 6, further comprising:

generating a time domain average from frequency domain averages calculated over multiple predetermined time intervals; and generating the third threshold value on the basis of the time domain average.

8. The method of claim 6, wherein the error correction unit is configured to selectively eliminate the measured output generated over the predetermined time interval if the size of the output supplied to the interference determining unit exceeds the third threshold value.

9. The method of claim 4, wherein the integration output is generated for each of the frequencies from the difference output generated over multiple predetermined time intervals.

10. The method of claim 4, wherein the measured output represents the demodulated frequency domain signal with noise components and the reference output represents the demodulated frequency domain signal without any noise components.

11. A digital broadcasting receiver that is configured to receive frequency division multiplexing signals of multiple carriers, the receiver comprising:

a frequency domain transformer unit configured to transform a received time domain signal into a frequency domain signal;

a demodulation unit configured to perform demodulation of the frequency domain signal to generate a measured output;

a difference detection unit configured to calculate the difference between the measured output and a representative output;

an integrator unit configured to integrate for each frequency of the multiple carriers the difference output of the difference detection unit;

a noise detection unit configured to detect whether or not an impulse noise is present from an average of the difference output of the difference detection unit over a predetermined time interval;

a selection unit configured to select between the difference output of the difference detection unit and the integration output of the integrator unit and output one of them depending on whether or not impulse noise is detected by the noise detection unit; and an interference determining unit configured to determine a presence of interference if the size of the output selected by the selection unit exceeds a predefined value.

12. The digital broadcasting receiver according to claim 11, further comprising:

a correction unit configured to correct the frequency division multiplexing signals based on the size of the output selected by the selection unit.

13. The digital broadcasting receiver according to claim 12, wherein the noise detection unit includes:

a frequency domain averaging unit configured to calculate a frequency domain average of the difference output of the difference detection unit over the predetermined time interval;

a first quality determination unit configured to detect whether the frequency domain average exceeds a first threshold value; and a second quality determination unit configured to detect whether the frequency domain average falls below a second threshold value, wherein the impulse noise is determined to be present if the frequency domain average exceeds the first threshold value and falls below the second threshold value.

14. The digital broadcasting receiver according to claim 13, further comprising:

a time domain averaging unit configured to generate a time domain average from frequency domain averages calculated over multiple predetermined time intervals, wherein the predefined value is set on the basis of the time domain average.

15. The digital broadcasting receiver according to claim 12, wherein the correction unit is configured to selectively eliminate the measured output generated over the predetermined time interval.

16. The digital broadcasting receiver according to claim 11, wherein the integration output is generated for each of the frequencies from the difference output generated over multiple predetermined time intervals.

17. The digital broadcasting receiver according to claim 11, wherein the measured output represents the demodulated frequency domain signal with noise components and the reference output represents the demodulated frequency domain signal without any noise components.

* * * * *